United States Patent [19]

Hirosawa et al.

[11] Patent Number: 5,854,294

[45] Date of Patent: Dec. 29, 1998

[54] PROCESS FOR PRODUCING FOAMED BODY OF POLYCARBONATE RESIN AND FOAMED BODY OBTAINED THEREBY

[75] Inventors: Kuninori Hirosawa, Utsunomiya; Yoshihisa Ishihara, Tochigi-ken; Takeshi Aoki, Imaichi; Yasushi Terui, Utsunomiya; Yoshinori Shimojo, Kashiwa; Hiroyuki Gokuraku, Utsunomiya; Naochika Kogure, Utsunomiya, all of Japan

[73] Assignee: JSP Corporation, Japan

[21] Appl. No.: 783,206

[22] Filed: Jan. 14, 1997

[30] Foreign Application Priority Data

Jan. 19, 1996 [JP] Japan ................................ 8-025847
Mar. 19, 1996 [JP] Japan ................................ 8-090235
Sep. 6, 1996 [JP] Japan ................................ 8-257856
Sep. 6, 1996 [JP] Japan ................................ 8-257857

[51] Int. Cl.$^6$ .................................. C08J 9/04; C08J 9/14
[52] U.S. Cl. .............................. 521/79; 521/97; 521/138; 521/182; 521/81
[58] Field of Search ............................. 521/79, 182, 138, 521/97, 81

[56] References Cited

U.S. PATENT DOCUMENTS 4,500,653  2/1985  Schmidt et al. ........................ 521/182
4,728,673  3/1988  Hammer et al. ........................ 521/182
5,158,985  10/1992  Köhler et al. ........................... 521/99

*Primary Examiner*—Morton Foelak
*Attorney, Agent, or Firm*—Lorusso & Loud

[57] ABSTRACT

A polycarbonate resin-containing composition is extruded through a die together with a blowing agent to produce a foamed body. The composition has a storage modulus $G'_A$ dyn/cm$^2$ at a temperature of 250° C. and an angular frequency of 0.1 rad/sec and a storage modulus $G'_B$ dyn/cm$^2$ at a temperature of 250° C. and an angular frequency of 10 rad/sec, wherein the storage modulus $G'_A$ and storage modulus $G'_B$ satisfy the following conditions:

$$0 \leq \alpha \leq 2.0$$

$$2.20 \leq \beta \leq 5.70$$

where $\alpha$ represents $(\log G'_B - \log G'_A)/2$ and $\beta$ represents $(\log G'_{B+log G'_A})/2$.

14 Claims, 4 Drawing Sheets

PROCESS FOR PRODUCING FOAMED BODY OF POLYCARBONATE RESIN AND FOAMED BODY OBTAINED THEREBY

BACKGROUND OF THE INVENTION

This invention relates to a process for producing a foamed body such as a sheet or a plate formed of a polycarbonate resin. The present invention also pertains to a foamed body of a polycarbonate resin.

Because of its excellent heat resistance, water resistance, long service life and electrical and mechanical properties, a polycarbonate resin is now increasingly utilized for various applications such as interior materials for cars or houses and receptacles for retort food and food to be heated with microwave ovens. However, since a polycarbonate resin has a high fluidizing point, a low melt viscosity and a low melt tensile force, it is very difficult to produce foamed bodies, especially foamed sheets and plates by extrusion.

In particular, an extruded foamed sheet discharged from a die lip is apt to form cracks when received by a mandrel, so that the foamed sheet has poor surface appearance. When a foamed sheet is prepared with a circular die, it is impossible to produce a sheet having a width of more than 500 mm, since a large diameter mandrel cannot be used for the insertion into an extruded foamed tube of a polycarbonate resin. At present, extrusion foaming of a polycarbonate resin is performed using a small diameter circular die at a blow ratio (ratio of the diameter of a mandrel to that of the circular die) of 2.5 or less. A large width sheet might be produced when a large diameter circular die is used. In this case, however, it is difficult to maintain the pressure in die at a high pressure, so that foaming takes place in the die, resulting in the degradation of surface appearance and mechanical strength of the foamed product.

JP-A-2-261836 proposes the use of an organic blowing agent having a specific solubility and JP-B-47-43183 proposes the use of an isoparaffin blowing agent for the production of a polycarbonate foamed body. These methods, however, cannot solve the above problems and fail to produce foamed sheets having desired thickness, width and density.

Injection molding is also adopted for the production of foamed molded bodies. This method, however, requires molds and cannot continuously produce the foamed bodies.

SUMMARY OF THE INVENTION

It is, therefore, a prime object of the present invention to provide a process which can produce a foamed body of a polycarbonate having a high expansion ratio and an excellent surface appearance.

Another object of the present invention is to provide a process which can produce a foamed sheet or plate of a polycarbonate having a large thickness and width.

It is a further object of the present invention to provide a foamed body having the above-described characteristics.

In accomplishing the foregoing objects, there is provided in accordance with one aspect of the present invention a process for producing a foamed body, comprising extruding a composition comprising a polycarbonate resin through a die together with a blowing agent, said composition having a storage modulus $G'_A$ dyn/cm$^2$ at a temperature of 250° C. and an angular frequency of 0.1 rad/sec and a storage modulus $G'_B$ dyn/cm$^2$ at a temperature of 250° C. and an angular frequency of 10 rad/sec, said storage modulus $G'_A$ and storage modulus $G'_B$ satisfying the following conditions:

$$0 \leq \alpha \leq 2.0$$

$$2.20 \leq \beta \leq 5.70$$

wherein α represents $(\log G'_B - \log G'_A)/2$ and β represents $(\log G'_B + \log G'_A)/2$.

In another aspect, the present invention provides a foamed body of a composition comprising a polycarbonate resin, said composition having a storage modulus $G'_A$ dyn/cm$^2$ at a temperature of 250° C. and an angular frequency of 0.1 rad/sec and a storage modulus $G'_B$ dyn/cm$^2$ at a temperature of 250° C. and an angular frequency of 10 rad/sec, said storage modulus $G'_A$ and storage modulus $G'_B$ satisfying the following conditions:

$$0 \leq \alpha \leq 2.0$$

$$2.20 \leq \beta \leq 5.70$$

wherein α represents $(\log G'_B - \log G'_A)/2$ and β represents $(\log G'_B + \log G'_A)/2$.

It has now been found that a polycarbonate resin-containing composition having the above specific modulus characteristics can give, upon extrusion foaming, a foamed sheet or plate having satisfactory thickness, width and density. The modulus characteristics of the polycarbonate resin-containing composition may be determined by the measurement of the viscoelasticity thereof with a rheometer (e.g. Dynamic Analyzer SR200 manufactured by Rheometric Scientific F. E. Ltd.) at 250° C. A controlled stress of $1 \times 10^4$ to $3 \times 10^4$ dyn/cm$^2$, typically $2 \times 10^4$ dyn/cm$^2$ is applied to a sample. Measurement of viscoelasticity is well known in the art and is described in, for example, Polymer Rheology, L. E. Nielson, Marcel Decker, 1977; Viscoelastic Properties of Polymers, J. D. Ferry, 3rd Edition, Willey, 1980; Rheometers of Moltent Plastics, J. M. Dealy, Van Nostrand Reinhold, 1982; and Physical Properties of Polymers, J. E. Mark, A. Eisenberg, W. W. Grassley, L. Mandelkern and J. L. Koenig, American Chemical Society, 1984.

It has been confirmed that the modulus characteristics of the polycarbonate resin-containing composition prior to extrusion foaming are substantially the same as those of the foamed body obtained therefrom when the foamed body is melted and defoamed by heat press.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
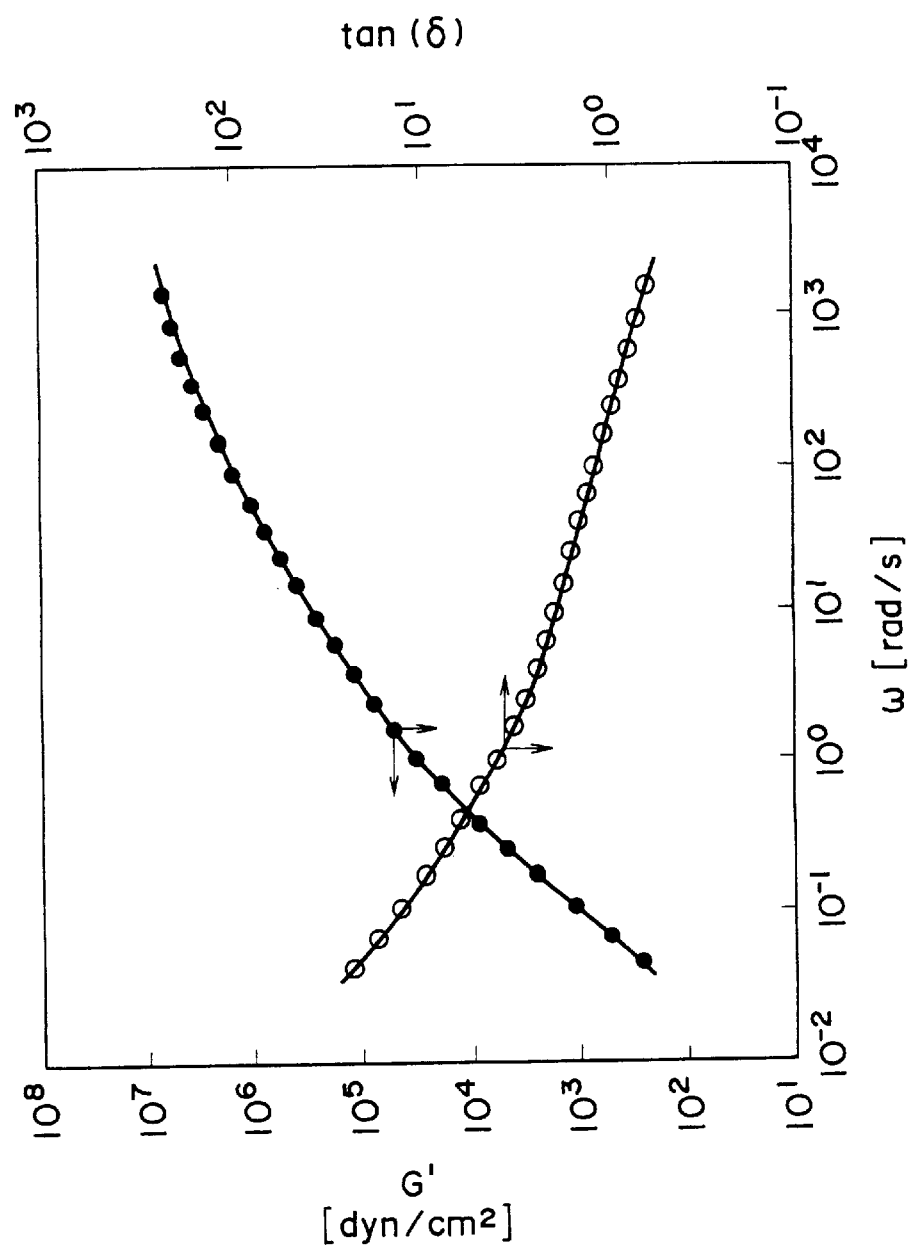
FIGS. 1–4 are graphs showing the relationship between the storage modulus G' of the blends used in Examples 1, 8, 9 and 10 and angular frequency ω and the relationship between tanδ of these blends and angular frequency ω, respectively.

A foamed body according to the present invention may be obtained by extruding a composition comprising a polycarbonate resin through a die together with a blowing agent.

The polycarbonate resin is preferably of a type which is obtained from a bisphenol such as 2,2-bis(4-oxyphenyl)propane (bisphenol A), 2,2-bis(4-oxyphenyl)butane, 1,1-bis (4-oxyphenyl)cyclohexane, 1,1-bis(4-oxyphenyl)isobutane or 1,1-bis(4-oxyphenyl)ethane, for reasons of high resistance to heat, acid and weather.

The polycarbonate resin-containing composition can contain one or more desired additives such as a foam-controlling agent, a flame retarding agent, a heat stabilizing agent, a weatherability-improving agent and a coloring agent. The foam-controlling agent may be an inorganic filler such as talc, silica, a salt of a polycarboxylic acid, a mixture of a polycarboxylic acid with sodium carbonate or sodium hydrogen carbonate, or the like inorganic particles. The foam-controlling agent is generally used in an amount of 0.01–1.0 part by weight, preferably 0.05–0.5 part by weight, per 100 parts by weight of the polycarbonate resin-containing composition.

The polycarbonate resin-containing composition has a storage modulus $G'_A$ dyn/cm$^2$ at a temperature of 250 C. and an angular frequency of 0.1 rad/sec and a storage modulus $G'_B$ dyn/cm$^2$ at a temperature of 250° C. and an angular frequency of 10 rad/sec. It is important that the storage modulus $G'_A$ and storage modulus $G'_B$ should satisfy the following conditions:

$$0 \leq \alpha \leq 2.0$$

and $$2.20 \leq \beta \leq 5.70$$

wherein $\alpha$ represents $(\log G'_B - \log G'_A)/2$ and $\beta$ represents $(\log G'_B + \log G'_A)/2$.

When $\alpha$ exceeds 2.0, cells are easily broken during foaming so that good foamed bodies cannot be obtained. The value $\alpha$ is preferably 0.9–1.85, more preferably 0.9–1.8, most preferably 1.0–1.6. When $\beta$ is less than 2.20, cells are easily broken during foaming so that good foamed bodies cannot be obtained. On the other hand, too large a value $\beta$ beyond 5.70 is disadvantageous because the extruded resin hardly expands. The value $\beta$ is preferably 2.30–5.00.

For reasons of improved expansion ratio and increased thickness and width of the foamed body, it is preferred that the composition have a value $G''/G'$ (=$\tan\delta$) of 1–190 (namely $G' \leq G'' \leq 190G'$), more preferably 1–70 (namely $G' \leq G'' \leq 70G'$), most preferably 1–20 (namely $G' \leq G'' \leq 20G'$), wherein $G''$ and $G'$ represent a loss modulus (in dyn/cm$^2$) and a storage modulus (in dyn/cm$^2$), respectively, of the composition at a temperature of 250° C. and an angular frequency of 0.1–10 rad/sec.

The polycarbonate resin-containing composition having the above-mentioned specific modulus characteristics may be obtained in various methods. One suitable method is to use two or more kinds of polycarbonate resins having different molecular weights in combination. Another preferable method is to use a polycarbonate resin having one or more branched chains with controlled lengths. A further particular method is to use a polycarbonate resin having a storage modulus of at least 1×10$^5$ dyn/cm$^2$ at a temperature of 250° C. and an angular frequency of 1 rad/sec in conjunction with a polycarbonate resin having a storage modulus of not greater than 2×10$^2$ dyn/cm$^2$ at a temperature of 250° C. and an angular frequency of 1 rad/sec. A still further suitable method is to use a polycarbonate resin in combination with an additional polymer such as a low density polyethylene, a high density polyethylene, a linear low density polyethylene, polyethylene terephthalate, polybutylene terephthalate, polyacrylic acid, polymethyl acrylate, polyethyl acrylate, polymethacrylic acid, polymethyl methacrylate, polyethyl methacrylate, acrylonitrile-styrene copolymer or acrylonitrile-styrene-butadiene terpolymer. The additional polymer preferably has a viscosity average molecular weight of at least 500,000, more preferably at least 800,000. The additional polymer is preferably used in an amount of 0.3–15%, more preferably 0.5–8%, based on the total weight of the additional polymer and the polycarbonate resin. Of course, the above methods may be suitably combined. The values of $\alpha$ and $\beta$ may be controlled by changing the mixing ratio, molecular weight, length of branched chains, etc.

The polycarbonate resin-containing composition is melted and extruded through a die together with a blowing agent to obtain a foamed product. Any blowing agent such as an inorganic blowing agent, a volatile organic blowing agent or a decomposition-type blowing agent, may be used for the purpose of the present invention. However, the use of a decomposition-type blowing agent is less preferable, since the resulting foamed product has a low expansion ratio and small pore diameters. Examples of suitable volatile organic blowing agents include lower aliphatic hydrocarbons such as propane, n-butane, i-butane, n-pentane, i-pentane and hexane; lower alicyclic hydrocarbons such as cyclobutane and cyclopentane; aromatic hydrocarbons such as benzene, toluene and xylene; aliphatic monohydric alcohols such as methanol and ethanol; lower aliphatic ketones such as acetone and methyl ethyl ketone; and low boiling point halogenated hydrocarbons such as 1-chloro-1,1-difluoroethane, 1,1,1,2-tetrafluoroethane and 1,1-difluoroethane. Examples of suitable inorganic blowing agents include carbon dioxide, air and nitrogen. The above blowing agents may be used singly or in combination of two or more thereof.

The amount of the blowing agent used varies with the kind thereof and the desired expansion ratio (density). Generally, the blowing agent is used in an amount of 0.5–10 parts by weight in the case of a volatile organic blowing agent and 0.3–15 parts by weight in the case of an inorganic blowing agent per 100 parts by weight of the polycarbonate resin-containing composition.

In the case of the production of a foamed sheet, a melt of the above composition mixed with a blowing agent is generally extruded through a circular die. The extrudate is inflated by an air pressure applied inside thereof to form a balloon. In this case, it is desirable to cool the balloon immediately after extrusion with air from inside and outside thereof, since the resulting foamed sheet has uniform cell diameters and excellent surface conditions. The balloon is inserted with and received by a columnar mandrel serving also as a cooler. During passage thereof over the periphery of the mandrel, the foaming of the extrudate are completed. The foamed tube is then longitudinally cut to obtain a foamed sheet.

Since the polycarbonate resin-containing composition has specific $\alpha$ and $\beta$ values, a foamed sheet with large thickness and large width can be obtained using a large diameter circular die at a blow ratio (ratio of the diameter of a mandrel to the diameter of a circular die) of at least 1.8, preferably 2.0–5.0. For reasons of good surface conditions and improved thermal moldability of the foamed sheet, it is preferred that the blow ratio be not greater than 3.0. The foamed sheet thus obtained preferably has a thickness of 0.5–10 mm (more preferably 0.7–5 mm), a width of at least 500 mm, a density of 0.04–0.4 g/cm$^3$ (more preferably 0.06–0.35 g/cm$^3$) and an average pore size of 100–500 μm. When the density of the foamed sheet is below 0.04 g/cm$^3$, the mechanical strengths thereof becomes unsatisfactory. Too high a density of the foamed sheet in excess of 0.4 g/cm³ is disadvantageous because the heat insulating property thereof is poor, the weight thereof increases and the production costs thereof increase. A thickness of the foamed sheet below 0.5 mm is insufficient to provide satisfactory mechanical strengths. Too large a thickness in excess of 10 mm is apt to cause molding failure in thermal molding because the difference in temperature between both sides thereof is great.

The term "average pore size" herein is defined as follows:

$$A = (A_1 + A_2 + A_3)/3$$

where A represents the average pore size, $A_1$ represents an average of pore diameters in the direction parallel with the extrusion (longitudinal) direction, $A_2$ represents an average of pore diameters in the thickness direction and $A_3$ represents an average of pore diameters in the width (lateral) direction.

If desired, the foamed sheet may be composited with one or more layers to form a laminate. Such a layer may be, for example, a thermoplastic resin layer (e.g. a polycarbonate resin layer) or a reinforcing layer containing a reinforcing material (e.g. glass fibers or carbon fibers) dispersed in a matrix resin of a thermoplastic or thermosetting resin (e.g. an unsaturated polyester resin).

In the case of the production of a foamed plate, a melt of the above composition mixed with a blowing agent is generally extruded through a flat die. The extrudate discharged into the air is immediately guided between a pair of upper and lower plates or belt conveyors serving to function as a mold and a cooler.

The use of the upper and lower plates or belt conveyors is effective in producing a foamed plate having a large thickness, a high expansion ratio, good dimensional stability, good surface smoothness, high thickness accuracy and high mechanical strengths. The resistance against the movement of the extruded plate in the extrusion direction by the upper and lower plates or belt conveyors, the formation of thin skins on opposite surfaces and the formation of cells with adequate shapes are considered to account for the above characteristics.

To improve the surface smoothness, it is also desirable that the surfaces of the upper and lower plates or belt conveyors that are brought into contact with the extruded plate be formed of or applied with a coating of a low frictional material such as polytetrafluoroethylene. It is further preferred that the upper and lower plates or belt conveyors be provided with a cooler such as chilling pipes to cool the extruded foamed plate (to a temperature lower than the Vicat softening point (Japanese Industrial Standard JIS K7206 Condition A) of the polycarbonate resin composition) and to form substantially spherical cells in the surface portion of the foamed plate so that the formation of smooth surface skins is expedited. The upper and lower plates or conveyors are generally disposed in parallel with each other. But, in order to control the shape of cells, the orientation of the plates or conveyors may be slightly slanted such that the vertical space therebetween increases in the extrusion direction. For reasons of excellent mechanical strengths especially compression strength, it is preferred that the cells in a middle portion (in the thickness direction) of the foamed plate have an ellipsoidal crosses-section (when cut along the thickness direction) with it major axis being in parallel with the thickness direction.

The foamed plate preferably has a density of 0.03–0.6 g/cm³, more preferably 0.05–0.3 g/cm³, a thickness of at least 7 mm, more preferably at least 10 mm, and a sectional area (when cut along the thickness direction) of at least 20 cm². The skin layer preferably has a thickness of 0.3–7 mm and substantially spherical cells with an average pore size of 200 μm or less, more preferably 150 μm or less. The pore diameter (in the thickness direction) in the middle (in the thickness direction) portion of the foamed plate is preferably 1,000 μm or more.

When the density of the foamed plate is below 0.03 g/cm³, the mechanical strengths, especially toughness, tend to be reduced. When the density of the foamed plate is greater than 0.6 g/cm³, the weight thereof significantly increase and the machinability (such as cutting) thereof is apt to be poor. A foamed plate having a thickness of below 7 mm tends to form corrugates and to cause a difficulty in obtaining satisfactory surface conditions. A foamed plate with a sectional area of below 20 cm² is not valuable because of its insufficient width and thickness. When the cell size of the skin layer exceeds 200 μm, the feeling of smoothness tends to be deteriorated. When the pore diameter in the middle portion of the foamed sheet is less than 1,000 μm, the compression strength thereof is not fully satisfactory.

The following examples will further illustrate the present invention. Parts are by weight.

EXAMPLE 1

A branched polycarbonate resin (100 parts) obtained from bisphenol A and having a viscosity average molecular weight of 26,000 was melted and mixed with 0.1 part of talc in an extruder to obtain a blend. After charging n-pentane in an amount of 0.56 mol per kg of the resin to the extruder, the blend was extruded through a circular die at 210° C. and the expanded tubular extrudate was received on a mandrel. The circular die had a diameter of 134 mm and a die clearance of 0.7 mm. The mandrel had an outer diameter of 418 mm. The discharge rate of the tubular extrudate was 100 kg/hour. During the passage of the tubular extrudate over the outer peripheral surface of the mandrel, the tube was cooled. The mandrel was provided with a cutter at its downstream end so that the cooled tube was longitudinally cut to obtain a sheet. The values of α, β and tanδ of the blend, extrusion conditions and properties of the thus obtained foamed sheet are summarized in Table 1-1. Also shown in FIG. 1 are the relationship between the storage modulus G' of the blend and angular frequency ω (shown by black circles) and the relationship between tanδ of the blend and angular frequency ω (shown by white circles).

EXAMPLE 2

Example 1 was repeated in the same manner as described except that a mixture (viscosity average molecular weight: 29,000) of relatively high molecular weight and relatively low molecular weight polycarbonate resins each obtained from bisphenol A was used as a raw material polycarbonate, a circular die having a diameter of 65 mm and a mandrel having a diameter of 200 mm were used, and that the discharge rate of tubular extrudate was 50 kg/hour. The values of α, β and tanδ of the blend of the polycarbonate resin mixture with talc, extrusion conditions and properties of the thus obtained foamed sheet are summarized in Table 1-1.

EXAMPLE 3

Example 2 was repeated in the same manner as described except that the amount of talc was increased to 0.2 part and that a mandrel having a diameter of 165 mm was used. The values of α, β and tanδ of the blend of the polycarbonate resin mixture with talc, extrusion conditions and properties of the thus obtained foamed sheet are summarized in Table 1-1.

EXAMPLE 4

Example 2 was repeated in the same manner as described except that a polycarbonate resin having a viscosity average molecular weight of 32,000 was used. The $\alpha$, $\beta$ and tan$\delta$ values of the blend of the polycarbonate with talc, extrusion conditions and properties of the thus obtained foamed sheet are summarized in Table 1-1.

Comparative Example 1

Example 1 was performed in the same manner as described except that a commercially available polycarbonate resin prepared from bisphenol A and having a viscosity average molecular weight of 17,000 was used. However, the cells were broken during foaming so that a satisfactory foamed sheet was not able to be obtained. The $\alpha$, and $\beta$ values of the blend of the polycarbonate resin with talc are shown in Table 1-2.

Comparative Example 2

Example 2 was performed in the same manner as described except that a commercially available polycarbonate resin prepared from bisphenol A and having a viscosity average molecular weight of 21,000 was used. The $\alpha$ and $\beta$ values of the blend of the polycarbonate resin with talc, extrusion conditions and properties of the foamed sheet are summarized in Table 1-2.

Comparative Example 3

A commercially available polycarbonate resin (100 parts) obtained from bisphenol A and having a viscosity average molecular weight of 25,000 was melted and mixed with 0.02 part of talc in an extruder to obtain a blend. After charging methyl chloride to the extruder in an amount of 0.97 mol per kg of the resin, the blend was extruded through a circular die at 200° C. and the expanded tubular extrudate was received on a mandrel. The blow ratio was 2.3. During the passage of the tubular extrudate over the outer peripheral surface of the mandrel, the tube was cooled. The mandrel was provided with a cutter at its downstream end so that the cooled tube was longitudinally cut to obtain a sheet. The values of $\alpha$ and $\beta$ of the blend of the polycarbonate resin with talc, extrusion conditions and properties of the thus obtained foamed sheet are summarized in Table 1-2.

Comparative Example 4

Comparative Example 3 was repeated in the same manner as described except that the blow ratio was increased to 3.1. The extrusion conditions and properties of the thus obtained foamed sheet are summarized in Table 1-2.

In Tables 1-1 and 1-2, the values of $\alpha$, $\beta$ and tan$\delta$, content of closed cells, moldability, surface condition and average pore diameter are measured or evaluated as follows:

Values $\alpha$ and $\beta$

Using a dynamic viscoelasticity measuring device (Dynamic Analyzer SR200 manufactured by Rheometric Scientific F. E. Ltd.), the storage modulus G' of a sample is measured at 250° C. and at varying angular frequencies $\omega$. A sample resin plate having a thickness of about 2 mm was sandwiched between a pair of parallel plates (diameter: 25 mm) and heated to 250° C. The sample was slightly pressed and intimately contacted with the parallel plates. After removal of the resin flowed out of the plates, the sample was subjected to the viscoelasticity measurement. The results are plotted with log$\omega$) as abscissa and logG' as ordinate. The values of logG'$_A$ and logG'$_B$ at log$\omega$=-1 and log$\omega$=1, respectively, are read on the plots. The values $\alpha$ and $\beta$ are then calculated from logG'$_A$ and logG'$_B$ according to the equations:

$$\alpha = (\log G'_B - \log G'_A)/2$$

$$\beta = (\log G'_B + \log G'_A)/2$$

The values $\alpha$ and $\beta$ are substantially the same as the slope of the plots and the value at log$\omega$=0, respectively.

Value of tan$\delta$

Using a dynamic viscoelasticity measuring device (Dynamic Analyzer SR200 manufactured by Rheometric Scientific F. E. Ltd.), the storage modulus G' and loss modulus G" of a sample are measured at 250° C. and at varying angular frequencies $\omega$. The value of tan$\delta$ is given as G"/G'. The values of tan$\delta$ are those at angular frequencies $\omega$ in the range of 10 to $10^{-1}$.

Content of Closed Cells

The content of closed cells Fc (%) is measured by air pycnometer method according to the following equation:

$$Fc = [(Vx - Va(\rho_f/\rho_s))/(Va - Va(\rho_f/\rho_s))] \times 100$$

Vx: true volume of foamed body (cm$^3$)

Va: apparent volume of foamed body (cm$^3$)

$\rho_f$: density of foamed body (g/cm$^3$)

$\rho_s$: density of polycarbonate resin (g/cm$^3$)

Moldability

A sample foamed sheet is formed into a container having an opening size of 256 cm$^2$ and a depth of 6 cm by a plug assist molding method. Total 10 such containers are prepared and checked to see whether or not cracks or holes are formed. Moldability is rated as follows.

A: all containers show no defects

B: one or more containers have cracks

C: one or more containers have a hole

Surface Condition

Surface of a sample is checked for the smoothness. Surface condition is evaluated according to the following ratings:

A: surface is smooth

B: surface is irregular

Average Pore Diameter

A sample is cut in longitudinal and lateral directions and diameters of more than 300 pores are measured in each of the thickness direction and the directions normal to the thickness direction.

X: average of the diameters of pores on a longitudinal cross section in the direction perpendicular to the thickness direction;

Y: average of the diameters of pores on a lateral cross section in the direction perpendicular to the thickness direction;

Z: average of the diameters of pores in the thickness direction.

Viscosity Average Molecular Weight

Measurement is carried out at 25° C. using, as a solvent, methylene chloride for a polycarbonate resin or chloroform for an acrylic resin. Viscosity average molecular weight is determined by viscometry according to an equation of relationship between the limiting viscosity and the visosity average molecular weight.

TABLE 1-1

| Example | 1 | 2 | 3 | 4 |
|---|---|---|---|---|
| $\beta$ | 4.30 | 3.39 | 3.39 | 3.77 |
| $\alpha$ | 1.30 | 1.61 | 1.61 | 1.32 |
| $\tan\delta$ | 1.6–12 | 4.5–101 | 4.5–101 | 2.7–78 |
| Viscosity average molecular weight | 26,000 | 29,000 | 29,000 | 32,000 |
| Blow ratio | 3.1 | 3.1 | 2.5 | 3.1 |
| Density (g/cm$^3$) | 0.20 | 0.17 | 0.20 | 0.24 |
| Thickness (mm) | 2.5 | 2.1 | 1.0 | 1.6 |
| Width (mm) | 1,315 | 640 | 520 | 640 |
| Content of closed cells (%) | 85 | 83 | 82 | 82 |
| Moldability | A | A | A | A |
| Surface condition | A | A | A | A |
| Average pore diameter ($\mu$m) | | | | |
| X | 360 | 310 | 220 | 340 |
| Y | 320 | 280 | 225 | 340 |
| Z | 300 | 240 | 150 | 310 |

TABLE 1-2

| Comparative Example | 1 | 2 | 3 | 4 |
|---|---|---|---|---|
| $\beta$ | 2.09 | 2.10 | 2.15 | 2.15 |
| $\alpha$ | 1.09 | 1.45 | 1.4 | 1.4 |
| $\tan\delta$ | — | — | — | — |
| Viscosity average molecular weight | 17,000 | 21,000 | 25,000 | 25,000 |
| Blow ratio | 3.1 | 3.1 | 2.3 | 3.1 |
| Density (g/cm$^3$) | — | 0.40 | 0.35 | 0.34 |
| Thickness (mm) | — | 1.1 | 1.5 | 0.8 |
| Width (mm) | — | 640 | 475 | 640 |
| Content of closed cells (%) | — | 12 | 38 | 8 |
| Moldability | — | C | B | C |
| Surface condition | — | B | A | B |
| Average pore diameter ($\mu$m) | | | | |
| X | — | 200 | 230 | 230 |
| Y | — | 210 | 220 | 280 |
| Z | — | 180 | 280 | 200 |

EXAMPLES 5–9

Figure 2:
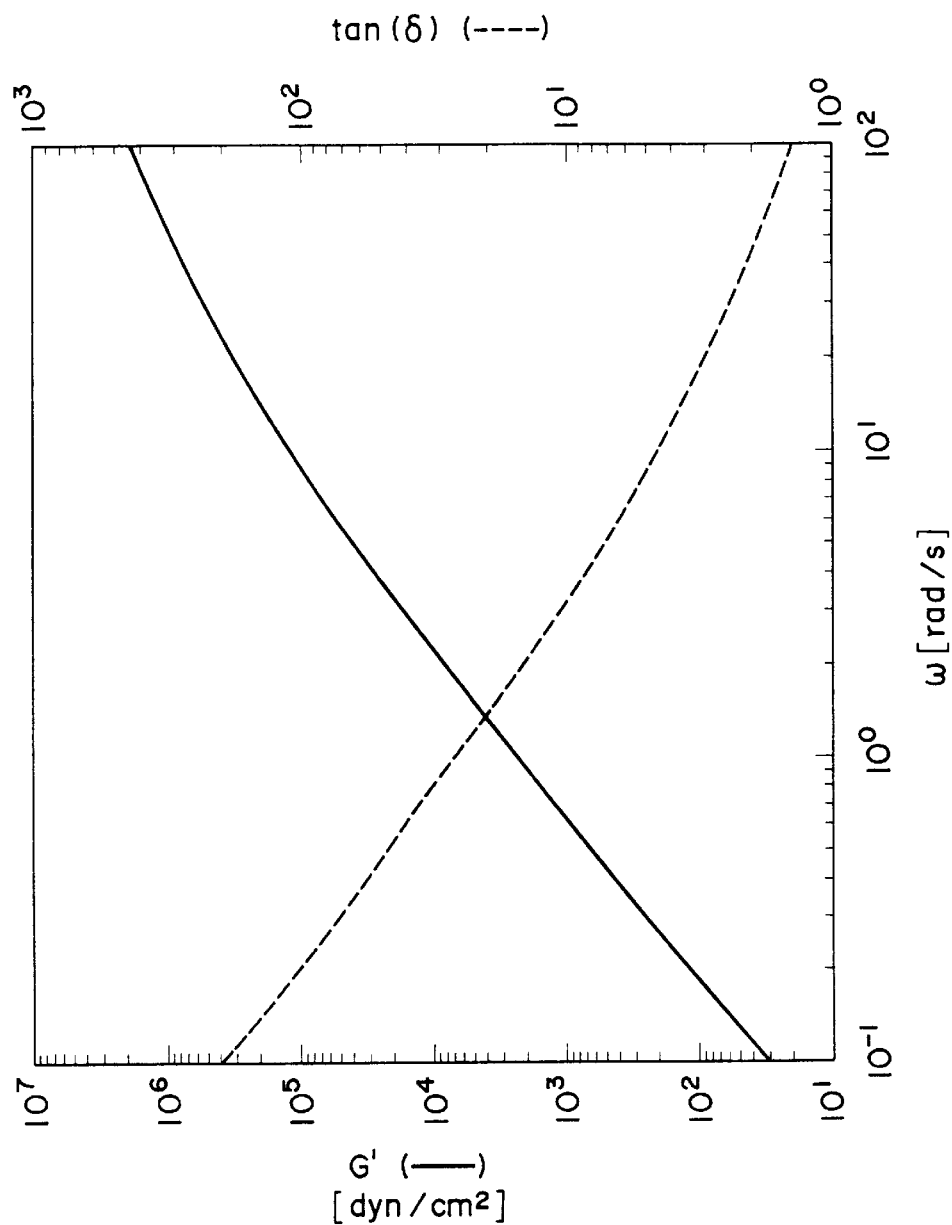
Figure 3:
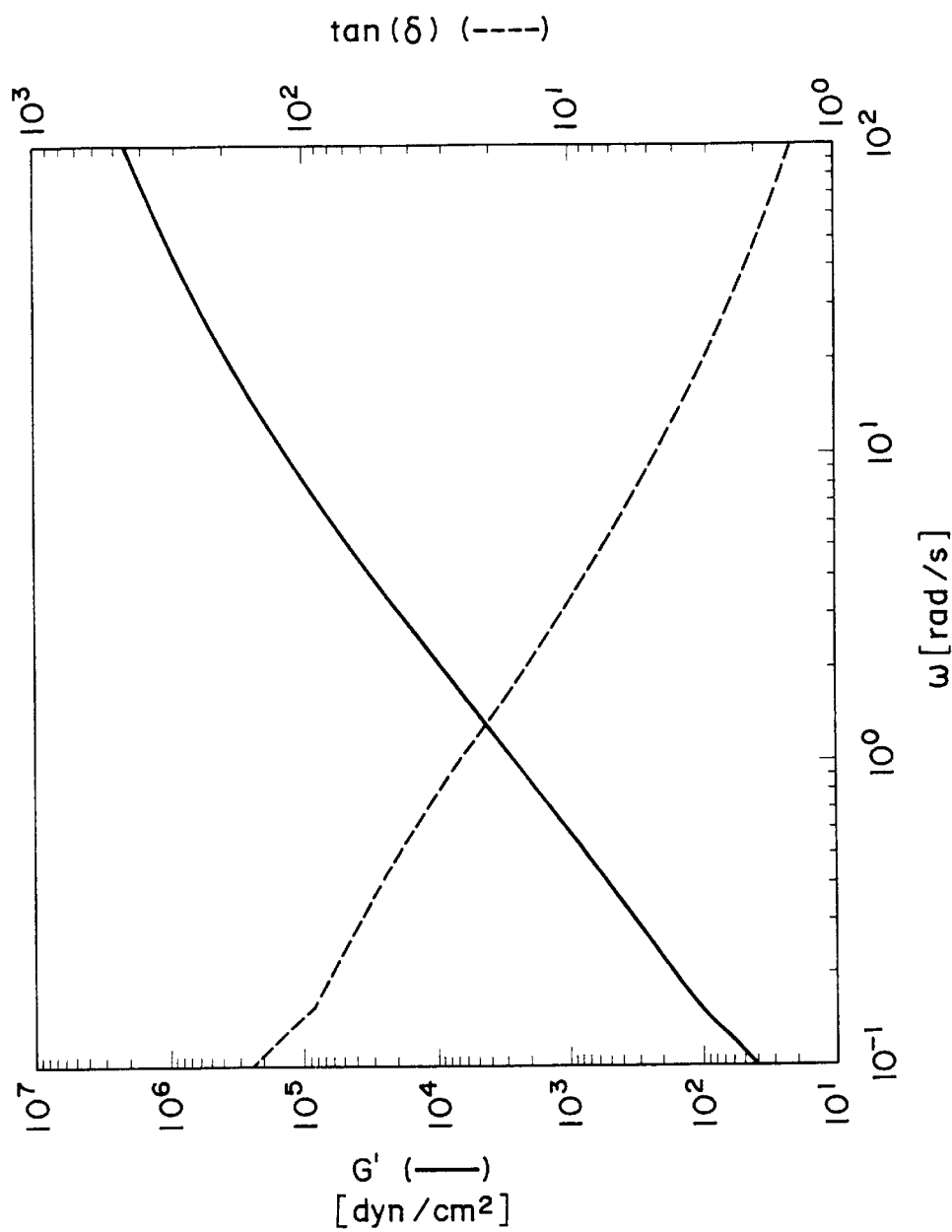

A polycarbonate resin (100 parts) obtained from bisphenol A and having a viscosity average molecular weight of 29,000 was melted and mixed with a quantity (as shown in Table 2) of an acrylic resin (poly(methyl methacrylate); viscosity average molecular weight and structure are shown in Table 2) and 0.1 part of talc in an extruder to obtain a blend. After charging n-pentane to the extruder in an amount of 0.17 mol per kg of the blend, the blend was extruded through a circular die at a resin temperature as shown in Table 2 and the expanded tubular extrudate was received on a mandrel. The circular die had a diameter of 65 mm. The mandrel had an outer diameter of 200 mm. During the passage of the tubular extrudate over the outer peripheral surface of the mandrel, the tube was cooled. The mandrel was provided with a cutter at its downstream end so that the cooled tube was longitudinally cut to obtain a sheet. The values of $\alpha$, $\beta$ and $\tan\delta$ of each of the blends of the polycarbonate resin, poly(methyl methacrylate) and talc, extrusion conditions and properties of the thus obtained foamed sheets are summarized in Table 2. Also shown in FIGS. 2 and 3 are the relationship between the storage modulus G' of the blend of each of Examples 8 and 9 and angular frequency $\omega$ (shown by the solid line) and the relationship between $\tan\delta$ of the blend of each of Examples 8 and 9 and angular frequency $\omega$ (shown by the broken line).

TABLE 2

| Example | 5 | 6 | 7 | 8 | 9 |
|---|---|---|---|---|---|
| Polycarbonate (part) | 100 | 100 | 100 | 100 | 100 |
| Acrylic resin (part) | 0.5 | 1.0 | 1.0 | 1.0 | |
| Viscosity average molecular weight ($\times 10^4$) | 310 | 310 | 145 | 80 | 20 |
| Structure | linear | linear | linear | linear | branch |
| $\beta$ | 3.21 | 3.34 | 3.32 | 3.29 | 3.35 |
| $\alpha$ | 1.83 | 1.75 | 1.78 | 1.81 | 1.76 |
| $\tan\delta$ | 4.6 to 230 | 4.3 to 150 | 4.2 to 190 | 4.2 to 200 | 4.3 to 160 |
| Resin temperature (°C.) | 219 | 218 | 222 | 218 | 217 |
| Pressure at die (kg/cm$^2$) | 110 | 112 | 108 | 112 | 112 |
| Line speed (m/min) | 3.9 | 4.2 | 4.1 | 4.2 | 4.2 |
| Density (g/cm$^3$) | 0.24 | 0.24 | 0.24 | 0.24 | 0.24 |
| Thickness (mm) | 2.4 | 2.4 | 2.4 | 2.5 | 2.9 |
| Content of closed cells (%) | 83 | 81 | 79 | 83 | 83 |
| Moldability | A | A | A | A | A |
| Surface condition | A | A | A | A | A |

EXAMPLES 10 and 11

Figure 4:
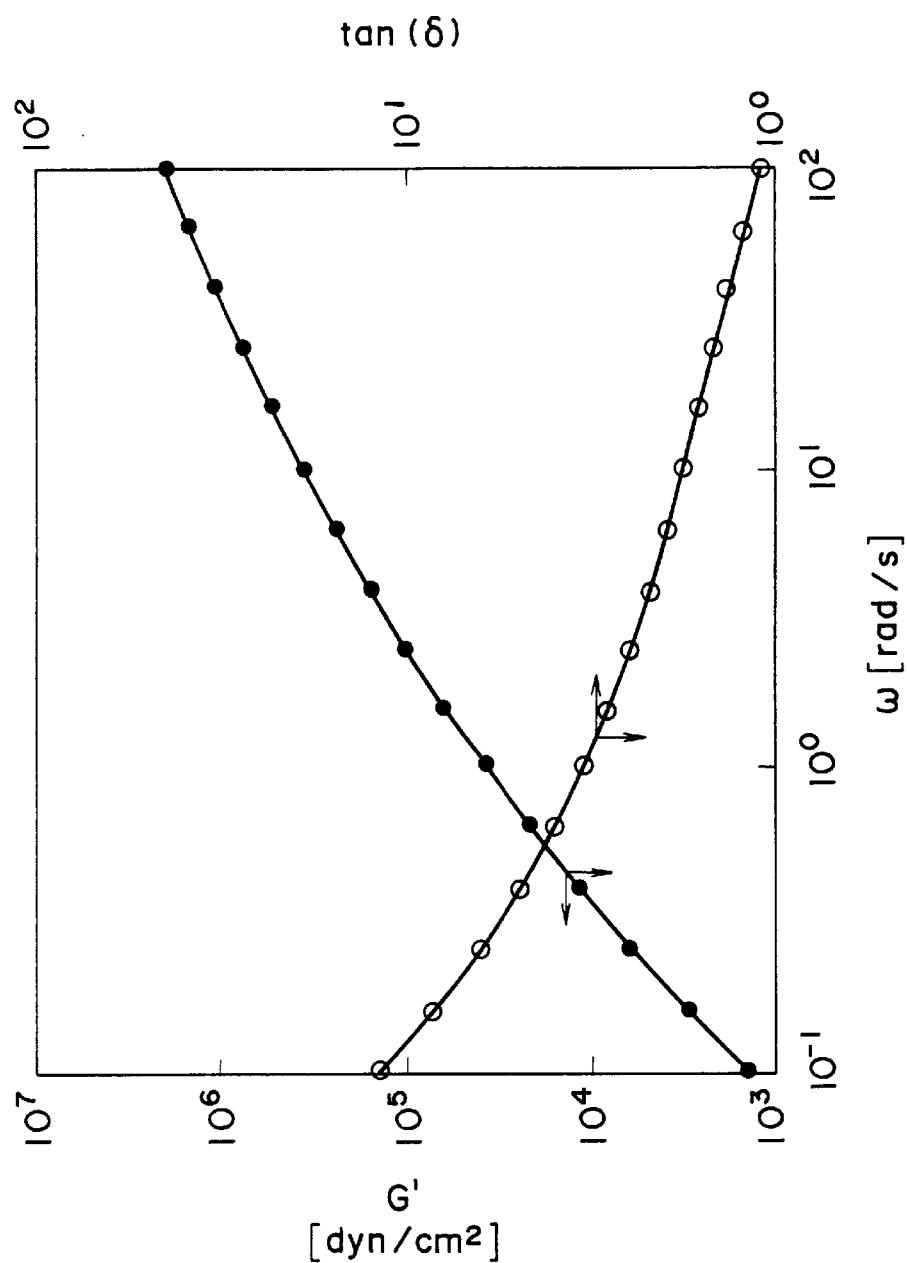

A branched polycarbonate resin (100 parts) obtained from bisphenol A was melted and mixed with a quantity (as shown in Table 3-1) of talc in an extruder to obtain a blend. After charging n-pentane in an amount as shown in Table 3-1 to the extruder, the blend was extruded through a die lip and allowed to foam at a temperature shown in Table 3-1. The extruded mass in the form of a plate was immediately guided between a pair of upper and lower plates and cooled therebetween to a temperature lower than the Vicat softening point of the blend. The cooled plate was continuously pulled by a pair of take-up rolls. The values of α, β and tanδ of the blend of the polycarbonate resin with talc, extrusion conditions and properties of the thus obtained foamed plate are summarized in Table 3-1. In Table 3, the 10% compression strength is measured in accordance with Japanese Industrial Standard JIS K7220. Also shown in FIG. 4 are the relationship between the storage modulus G' of the blend of Examples 10 and 11 and angular frequency ω (shown by black circles) and the relationship between tanδ of the blend of Examples 10 and 11 and angular frequency ω (shown by white circles).

Examples 12 and 13

Example 10 was repeated in the same manner as described except that the extrusion conditions were changed as shown in Table 3-1. The values of α, β and tanδ of the blend of the polycarbonate resin with talc, extrusion conditions and properties of the thus obtained foamed plate are summarized in Table 3-1.

Example 14

Example 10 was repeated in the same manner as described except that a mixture of 40 parts of the same polycarbonate as used in Example 12 with 60 parts of a recovered polycarbonate was used as the raw material resin and that the extrusion conditions were changed as shown in Table 3-2. The values of α, β and tanδ of the blend of the polycarbonate resin with talc, extrusion conditions and properties of the thus obtained foamed plate are summarized in Table 3-2.

Comparative Example 5

Example 10 was performed in the same manner as described except that a commercially available polycarbonate resin prepared from bisphenol A was used and that the extrusion conditions were changed as shown in Table 3-2. However, the cells were broken during foaming so that a satisfactory foamed plate not able to be obtained. The α and β values of the blend of the polycarbonate resin with talc and the extrusion conditions are shown in Table 3-2.

Comparative Example 6

Example 10 was performed in the same manner as described except that a commercially available polycarbonate resin prepared from bisphenol A was used and that the extrusion conditions were changed as shown in Table 3-2. The α and β values of the blend of the polycarbonate resin with talc, extrusion conditions and properties of the foamed plate are summarized in Table 3-2.

TABLE 3-1

| Example | 10 | 11 | 12 | 13 |
|---|---|---|---|---|
| β | 4.3 | 4.3 | 3.2 | 3.2 |
| α | 1.2 | 1.2 | 1.8 | 1.8 |
| tanδ | 1.6 to 12 | 1.6 to 12 | 3.8 to 170 | 3.8 to 170 |
| Talc (wt %) | 0.05 | 0.05 | 0.05 | 0.05 |
| n-Pentane (wt %) | 3.0. | 4.0 | 2.0 | 1.0 |
| Resin temperature (°C.) | 206 | 196 | 205 | 210 |
| Density (kg/m$^3$) | 98 | 60 | 182 | 449 |
| Thickness (cm) | 2.00 | 2.00 | 0.94 | 0.82 |
| Width (cm) | 38.5 | 26.0 | 25.6 | 25.5 |
| Compression strength (kg/cm$^2$) | 3.7 | 4.4 | 9.9 | 11.5 |
| Content of closed cells (%) | 45.0 | 45.0 | 85.6 | 76.9 |
| Surface condition | A | A | A | A |

TABLE 3-2

| Example | 14 | | |
|---|---|---|---|
| Comparative example | | 5 | 6 |
| β | 2.4 | 2.0 | 2.1 |
| α | 1.7 | 1.1 | 1.5 |
| tanδ | 4.0 to 150 | — | — |
| Talc (wt %) | 0.05 | 0.05 | 0.05 |
| n-Pentane (wt %) | 2.0 | 1.5 | 2.0 |
| Resin temperature (°C.) | 207 | 205 | 209 |
| Density (kg/m$^3$) | 240 | — | 400 |
| Thickness (cm) | 2.20 | — | 0.4 |
| Width (cm) | 29.5 | — | 26.8 |
| Compression strength (kg/cm$^2$) | 13.0 | — | — |
| Content of closed cells (%) | 41.0 | — | 9.0 |
| Surface condition | A | — | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for producing a foamed plate or sheet having a density of 0.03–0.35 g/cm$^3$, said process comprising continuously extruding, through a die selected from circular extrusion dies and flat extension dies, a composition comprising a polycarbonate resin, a volatile organic blowing agent and an inorganic blowing agent, said composition having a storage modulus $G'_A$ dyn/cm$^2$ at a temperature of 250° C. and an angular frequency of 10 rad/sec, said storage modulus $G'_A$ and storage modulus $G'_B$ satisfying the following conditions:

$$0 \leq \alpha \leq 2.0$$

$$2.20 \leq \beta 5.70$$

wherein α represents $(\log G'_B - \log G'_A)/2$ and β represents $(\log G'_B + \log G'_A)/2$.

2. A process as claimed in claim 1, wherein said composition has a storage modulus G' dyn/cm$^2$ and a loss modulus G" dyn/cm$^2$ at a temperature of 250° C. and an angular frequency of 0.1–10 rad/sec, said storage modulus G' and loss modulus G" satisfying the following condition:

$$G' \leq G'' \leq 70G'.$$

3. A process as claimed in claim 1, wherein α is a number of 0.9–1.85 and β is a number of 2.30–5.0.

4. A process as claimed in claim 2, wherein said storage modulus G' and loss modulus G" satisfy the following condition:

$$G' \leq G'' \leq 20G'.$$

5. An extruded foamed plate or sheet having a density of 0.03–0.35 g/cm³ and a composition comprising a polycarbonate resin, said composition having a storage modulus $G'_A$ dyn/cm² at a temperature of 250° and an angular frequency of 0.1 rad/sec and a storage modulus $G'_B$ dyn/cm² at a temperature of 250° and an angular frequency of 10 rad/sec, said storage modulus $G'_A$ and storage modulus $G'_B$ satisfying the following conditions:

$$0 \leq \alpha \leq 2.0$$

$$2.20 \leq \beta \leq 5.70$$

wherein α represents $(\log G'_B - \log G'_A)/2$ and β represents $(\log G'_B + \log G'_A)/2$.

6. A foamed body as claimed in claim 5 and in the form of a sheet having a density of 0.04–0.35 g/cm³ and a thickness of 0.5–10 mm.

7. A foamed body as claimed in claim 5 and in the form of a plate having a thickness of at least 7 mm.

8. A foamed body as claimed in claim 5, wherein said composition has a storage modulus G' dyn/cm² and a loss modulus G" dyn/cm² at a temperature of 250° C. and an angular frequency of 0.1–10 rad/sec, said storage modulus G' and loss modulus G" satisfying the following condition:

$$G' \leq G'' \leq 70G'.$$

9. A foamed body as claimed in claim 5, wherein α is a number of 0.9–1.85 and β is a number of 2.30–5.0.

10. A foamed body as claimed in claim 5, wherein said storage modulus G' and loss modulus G" satisfy the following condition:

$$G' \leq G'' \leq 20G'.$$

11. A process as claimed in claim 1 wherein said volatile organic blowing agent is a lower aliphatic hydrocarbon.

12. A process as claimed in claim 11 wherein said lower aliphatic hydrocarbon is selected from the group consisting of butanes and pentanes.

13. A process in accordance with claim 12 wherein said inorganic blowing agent is carbon dioxide.

14. A process as claimed in claim 11 wherein said inorganic blowing agent is carbon dioxide.

* * * * *

UNITED STATES PATENT AND TRADEMARK OFFICE
CERTIFICATE OF CORRECTION

PATENT NO. : 5,854,294
DATED : December 29, 1998
INVENTOR(S) : HIROSAWA et al

It is certified that error appears in the above-indentified patent and that said Letters Patent is hereby corrected as shown below:

<u>IN THE ABSTRACT</u>, last line, "$(logG'_{B+logG'A})/2.$" should read --$(logG'_B + logG'_A)/2.$--

Col. 7, line 66, "logo)" should read --$log\omega$--.

Col. 8, in the formula between lines 21 and 25, "$(\rho f/\rho s)/$" should read --$(\rho f/\rho s))/$--.

Col. 10, in Table 2, line 2 ("Acrylic Resin (part)"), under Example 9, insert --1.0--; and
   in Table 2, line 15 ("Density (g/cm$^3$)"), under Example 7, "0.24" should read --0.26--.

Col. 12, in Table 3-2, line 7 ("(°C)"), under Example 6, "209" should read --200--.

Col. 12, line 52, delete "a volatile organic" and insert --and at least one--;
   line 53, after "agent", first instance, insert --selected from the group consisting of volatile organic blowing agents--; delete "an"; and "agent", second instance,

UNITED STATES PATENT AND TRADEMARK OFFICE
CERTIFICATE OF CORRECTION

PATENT NO. : 5,854,294
DATED : December 29, 1998
INVENTOR(S) : HIROSAWA et al

It is certified that error appears in the above-indentified patent and that said Letters Patent is hereby corrected as shown below:

should read --agents--;

line 55, after "frequency" insert --of 0.1 rad/sec and a storage modulus $G'_B$ dyn/cm² at a temperature of 250°C and an angular frequency--;

line 60, "$\beta 5.70$" should read --$\beta \leq 5.70$--;

Signed and Sealed this

Sixth Day of June, 2000

Q. TODD DICKINSON

Attest:

Attesting Officer

Director of Patents and Trademarks

UNITED STATES PATENT AND TRADEMARK OFFICE
CERTIFICATE OF CORRECTION

PATENT NO. : 5,854,294
DATED : December 29, 1998
INVENTOR(S) : Hirosawa, et al.

It is certified that error appears in the above-identified patent and that said Letters Patent is hereby corrected as shown below:

<u>Column 12,</u>
Line 51, delete "extension" and insert -- extrusion --.

Signed and Sealed this

Twenty-first Day of August, 2001

*Attest:*

*Nicholas P. Godici*

NICHOLAS P. GODICI
*Attesting Officer*     *Acting Director of the United States Patent and Trademark Office*